L. P. HALLADAY.
DOUBLE BUMPER BAR.
APPLICATION FILED AUG. 18, 1921.
1,395,045.
Patented Oct. 25, 1921.
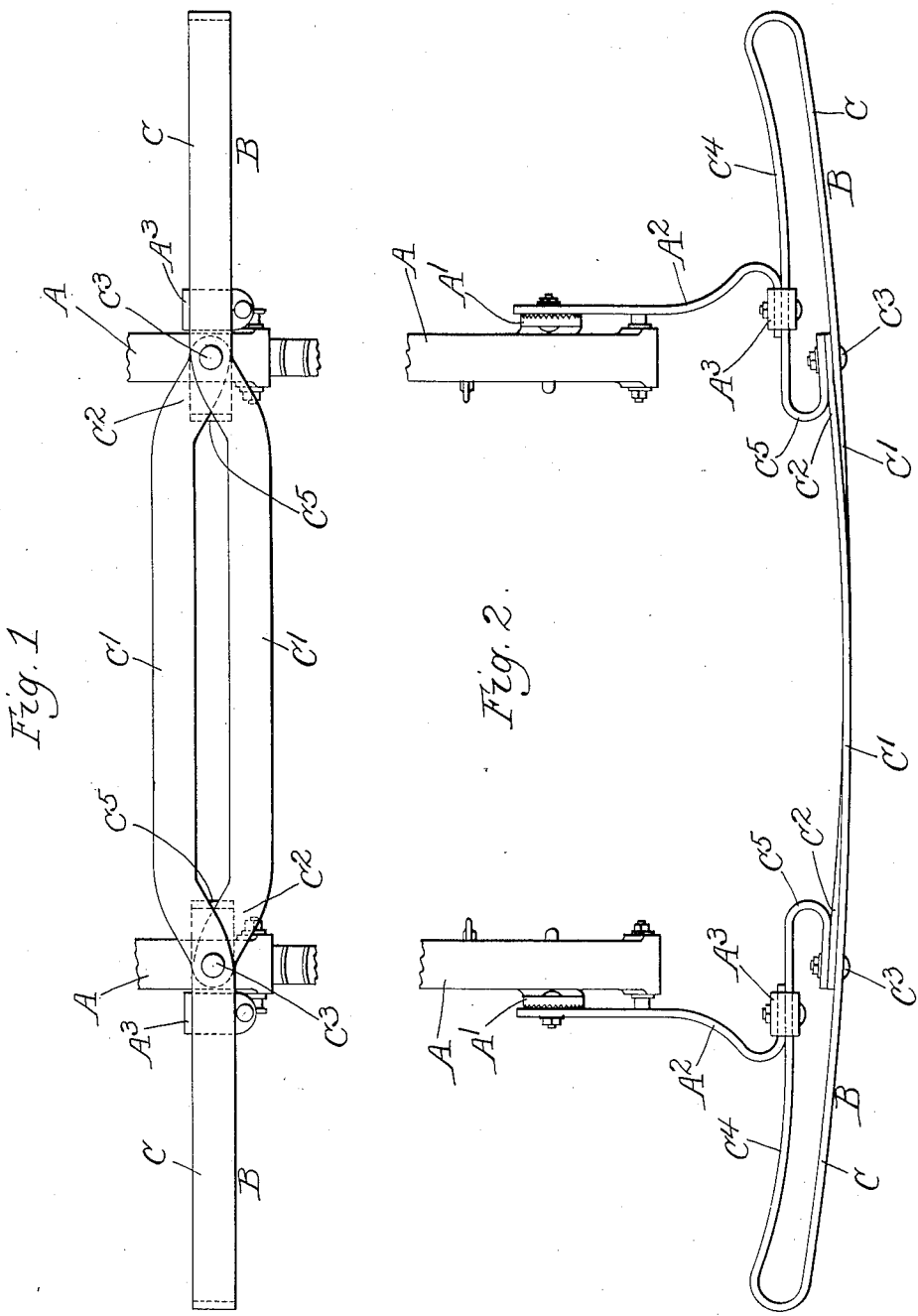
Witness.
Edward T. Wray.
Inventor.
Lewis P. Halladay.
by Parks & Carter
Attorneys.

UNITED STATES PATENT OFFICE.

LEWIS P. HALLADAY, OF DECATUR, ILLINOIS.

DOUBLE BUMPER-BAR.

1,395,045.   Specification of Letters Patent.   Patented Oct. 25, 1921.

Application filed August 18, 1921. Serial No. 493,307.

*To all whom it may concern:*

Be it known that I, LEWIS P. HALLADAY, a citizen of the United States, residing at Decatur, in the county of Macon and State of Illinois, have invented a certain new and useful Improvement in Double Bumper-Bars, of which the following is a specification.

My invention relates to improvements in automobile bumper bars of the type wherein there are for a part of the length of the bumper bar at least, two vertically disposed surfaces providing therefore, in effect, a vertically extended spring impact surface having narrower impact surfaces or elements at the ends. One object of my invention is to provide such a duplex automobile bumper bar in which the two elements making it up will be interchangeable, in which a minimum of fittings is required, and in which the parts will be durable and rigidly fastened together.

My invention is illustrated more or less diagrammatically in the accompanying drawings wherein:

Figure 1 is a front elevation,

Fig. 2 is a plan view.

Like parts are indicated by like characters throughout the drawings.

A A are the front frame horns of an automobile frame. A' A' are bumper supporting brackets attached to said horns. A² A² are bumper supporting bars projecting from the brackets. A³ A³ are bumper bar supporting yokes carried upon said arms adapted to engage the rear member of a spring bumper bar and hold it in place.

B B are identical spring bumper bar elements. It will be noted that they are exactly the same in size, shape and dimensions, so that when the two of them are reversed with respect one to another, they may be put together to form the bumper bar which I have shown.

Each of these spring elements is made up of a generally flat but slightly rearwardly curved front member C of such length as to extend throughout about one third of the total width. In addition to this there is a central portion C' downwardly or upwardly bent as the case may be from the portion C extending across about another third of the length. This portion C' is upwardly or downwardly bent again as at C² and terminates in line with the portion C where it intersects or engages the portion C of the opposed bumper elements and is fastened thereto by the bolt C³. At each end of the bumper, each of the sections C are rearwardly curved or looped and provided with an inwardly extended rear element C⁴ extending back about one-third of the way across the length of the bumper and terminating in a secondary loop or re-curved element C⁵ which loop terminates at the same place and in line with the end C² so that the bolt C³ passes through the end of the loop C⁵, the end of the member C², and the inner body of the element C just to the bend; and it is upon this re-curved element C⁴ that the clamps A³ are mounted for lateral adjustment to compensate for vehicle frames of varying width.

The elements C' are crossed as shown in Fig. 2 so that the ends C² are in both cases behind the bumper bar and there is disposed to the front, a smooth and unobstructed bumper bar surface.

The arrangement is such that the two spring loops one at either end, furnish a yielding or flexible support for the central laterally disposed portion of the bumper bar and for the end portions, the idea being that any shock or blow upon the central or end portions will be absorbed both in the bumper bar itself and in the spring loop members which reinforce it on the back at the ends.

The straight supporting bars are made of flat pieces of steel looped at their ends, but these loops are of such radiuses and so stiff and heavy that they have no spring function whatsoever because all the spring action is absorbed by the bumper bar long before these bumper arms have any chance to act effectively as springs.

It will be noted that with the two identical bar forming members, they can be interlocked so that the front portion of the bumper at one end is made out of the same bar as the rear portion at the other end and vice versa. The two bars are therefore entwined and bolted together and this results in producing a peculiarly rigid and durable structure, and one in which sudden distortion cannot result in separating or disassociating the parts.

While it will be evident that I have shown in my drawings an operative device, still many changes might be made in size, shape and arrangement of parts without departing from the spirit of my invention, and I wish therefore, that my drawings be regarded as in a sense, diagrammatic.

I claim—

1. A bumper bar comprising two closed horizontally disposed spring loops having curved ends and spaced one from the other, a vertically extended impact surface between them in line with their forward sides and means adjustable along their rear sides for attaching the bumper bar to a vehicle.

2. A bumper bar comprising two closed horizontally disposed spring loops having curved ends and spaced one from the other, a vertically extended impact surface between them in line with their forward sides and means adjustable along their rear sides for attaching the bumper bar to a vehicle, the front side of each of said loops being extended one upwardly and the other downwardly and both transversely toward the respective opposed loop and terminating adjacent the inner side of such loop.

3. A bumper bar comprising two closed horizontally disposed spring loops spaced one from the other, a vertically extended impact surface between them in line with their forward sides and means adjustable along their rear sides for attaching the bumper bar to a vehicle, the front side of each of said loops being extended one upwardly and the other downwardly and both transversely toward the respective opposed loop and terminating adjacent the inner side of such loop.

4. In a bumper bar a spring member bent to form a closed loop having curved ends, and a lateral extension parallel with the plane of the loop but offset therefrom immediately adjacent the loop and having a free end inclined to the extension and terminating in the plane of the loop.

5. In a bumper bar a flat spring strip, bent to form a closed loop, having curved ends, and a lateral extension parallel with the plane of the loop, offset at one end from the loop immediately adjacent thereto and inclined at its free end to terminate in the plane of the loop.

6. In a bumper bar a spring member bent to form a closed loop, and a lateral extension parallel with the plane of the loop but offset therefrom immediately adjacent the loop and having a free end inclined to the extension and terminating in the plane of the loop.

7. In a bumper bar a flat spring strip, bent to form a closed loop, a lateral extension parallel with the plane of the loop, offset at one end from the loop immediately adjacent thereto and inclined at its free end to terminate in the plane of the loop.

8. A bumper bar made up of two similar interlocking elements each comprising a closed loop having curved ends and a lateral extension offset from the plane of the loop and having a recurved end terminating at and attached to the opposed loop.

9. A bumper bar made up of two similar interlocking elements each comprising a closed loop and a lateral extension offset from the plane of the loop and having a recurved end terminating at and attached to the opposed loop.

10. A bumper bar made up of two similarly bent interlocking flat spring strips bent to form a closed loop having curved ends at either end of the bumper bar, said loops being horizontally disposed, the spring strips extending laterally from said loops across the bar, one above the other and located one above and one below the plane of the bar, the ends of the extensions being recurved and fastened at their extreme ends to the respective horizontally disposed loops.

11. A bumper bar made up of two similarly bent interlocking flat spring strips bent to form a closed loop at either end of the bumper bar, said loops being horizontally disposed, the spring strips extending laterally from said loops across the bar, one above the other and located one above and one below the plane of the bar, the ends of the extensions being recurved and fastened at their extreme ends to the respective horizontally disposed loops.

12. A bumper bar made up of two similarly bent interlocking flat spring strips bent to form a closed loop having curved ends at either end of the bumper bar, said loops being horizontally disposed, the spring strips extending laterally from said loops across the bar, one above the other and located one above and one below the plane of the bar, the ends of the extensions being recurved and fastened at their extreme ends to the respective horizontally disposed loops, the face of the spring strip being vertically disposed.

13. A bumper bar made up of two similarly bent interlocking flat spring strips bent to form a closed loop at either end of the bumper bar, said loops being horizontally disposed, the spring strips extending laterally from said loops across the bar, one above the other and located one above and one below the plane of the bar, the ends of the extensions being recurved and fastened at their extreme ends to the respective horizontally disposed loops, the face of the spring strip being vertically disposed.

14. A bumper bar made up of two similarly bent interlocking flat spring strips bent to form a closed loop having curved ends at either end of the bumper bar, said loops being horizontally disposed, the spring strips extending laterally from said loops across the bar, one above the other and located one above and one below the plane of the bar, the ends of the extensions being recurved and fastened at their extreme ends to the respective horizontally disposed loops, the face of the spring strip being vertically disposed, the ends of the two spring strips being fastened together by two rivets passing through the impact face of the bumper at the inner ends of each of the two spring loops.

15. A bumper bar made up of two similarly bent interlocking flat spring strips bent to form a closed loop at either end of the bumper bar, said loops being horizontally disposed, the spring strips extending laterally from said loops across the bar, one above the other and located one above and one below the plane of the bar, the ends of the extensions being recurved and fastened at their extreme ends to the respective horizontally disposed loops, the face of the spring strip being vertically disposed, the ends of the two spring strips being fastened together by two rivets passing through the impact face of the bumper at the inner ends of each of the two spring loops.

16. In a bumper bar a front impact member comprising two vertically disposed impact surfaces arranged one above the other on the central portion of the member and a single vertically disposed impact surface at either end of the central portion, a spring reinforcement for said bumper bar comprising spring loops one at either end behind the end portions, there being a curved spring connection between each end of said reinforcing member and the impact portion.

17. In an automobile bumper a spring impact member having a vertically disposed flat impact face bent at one end to form a spring loop having curved ends, the free end of the loop being located behind the impact surface and being inwardly extended toward the loop.

18. In an automobile bumper a spring impact member having a vertically disposed flat impact face bent at one end to form a spring loop having curved ends, the free end of the loop being located behind the impact surface and being inwardly extended toward the loop, the other end of the spring member being offset from the plane of the loop, extending laterally away from the loop.

19. In an automobile bumper a spring impact member having a vertically disposed flat impact face bent at one end to form a spring loop having curved ends, the free end of the loop being located behind the impact surface and being inwardly extended toward the loop, the other end of the spring member being offset from the plane of the loop, extending laterally away from the loop, and having an end inwardly inclined to and terminating in the plane of the loop.

20. In an automobile bumper a spring impact member having a vertically disposed flat impact face bent at one end to form a spring loop having curved ends, the free end of the loop being located behind the impact surface and being inwardly extended toward the loop, the other end of the spring member being offset from the plane of the loop, extending laterally away from the loop, and having an end inwardly inclined to and terminating in the plane of the loop, the bumper bar made up of two such elements interlocking and arranged so that the free end of each impact member is located between the loop end and the body of the other member, said free ends being riveted together.

Signed at Chicago, county of Cook and State of Illinois, this 10th day of August, 1921.

LEWIS P. HALLADAY.